Patented Apr. 21, 1936

2,037,717

UNITED STATES PATENT OFFICE 2,037,717

XANTHATES AND METHOD OF MAKING SAME

George De Witt Graves, Wilmington, Del., assignor to E. I. du Pont de Nemours & Company, Wilmington, Del., a corporation of Delaware No Drawing. Application November 9, 1932, Serial No. 641,873

14 Claims. (Cl. 260—99.11)

This invention relates to the preparation of xanthates, and more particularly pertains to the prepartion of xanthates of monohydric primary aliphatic alcohols of high molecular weight.

An object of the invention relates to the preparation of xanthates of monohydric primary aliphatic alcohols, whether saturated or unsaturated, containing seventeen or eighteen carbon atoms.

The xanthates comprising the subject matter of this invention are prepared according to the reaction:

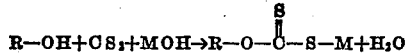

wherein R represents an aliphatic radical and M represents a metal preferably of the alkali metal group.

Typical alcohols from which the novel xanthates are derived are as follows:

Heptadecenyl alcohol _____ $C_{17}H_{33}OH$
Heptadecyl alcohol _____ $C_{17}H_{35}OH$
Isodihydroeleostearyl alcohol _____ $C_{18}H_{34}OH$
Stearolyl alcohol _____ $C_{18}H_{34}OH$
Elaidyl alcohol _____ $C_{18}H_{35}OH$
9,10-octadecenyl alcohol _____ $C_{18}H_{35}OH$
Octadecyl alcohol _____ $C_{18}H_{37}OH$ The alcohols utilized for the preparation of the new xanthates may be saturated or unsaturated and may be normal or branched. Where unsaturated alcohols are used, they may contain one or more unsaturated bonds, and such bonds may be either double or triple bonds.

The following examples illustrate the preparation of typical members of the novel xanthates described herein as embodying the subject matter of the invention:

Example 1

*Potassium octadecyl xanthate*

A mixture of 171 grams of octadecyl alcohol, 33.6 grams of finely powdered potassium hydroxide and 152 grams of carbon bisulfide was thoroughly stirred and allowed to stand overnight at room temperature. The yellow solid product was recrystallized from alcohol obtaining very light yellow crystals of potassium octadecyl xanthate analyzing 17.7% sulfur and 9.75 potassium compared to calculated values of 16.7 and 10.3 respectively.

Example 2

*Potassium 9,10-octadecenyl octadecyl xanthate*

A mixture of 50 grams of finely powdered potassium hydroxide, 200 grams of carbon bisulfide and 200 grams of a mixture of 9,10-octadecenyl and octadecyl alcohols (50% by weight of 9,10-octadecenyl alcohol and 50% by weight of octadecyl alcohol) was stirred together and allowed to stand at room temperature. The mass soon solidified to a yellow crystalline consistency, and contained potassium octadecyl xanthate and potassium 9,10-octadecenyl xanthate. The individual xanthate may be obtained from the mixture by the usual methods of separation, e. g., fractional crystallization.

From the above examples it is evident that an admixture of an alcohol of the group listed above with carbon bisulfide and a caustic alkali will react at room temperature to yield the xanthate salt corresponding to the alcohol used. The proportions of the reacting ingredients may be varied between wide limits. The temperature may likewise be varied to a certain extent above and below room temperature. The alkali used while preferably non-aqueous, may be either dissolved or dispersed through an aqueous medium. The alkali used may be either potassium hydroxide, or sodium hydroxide, the xanthate produced being respectively the potassium or the sodium salt.

Single xanthates may be prepared by reacting a single alcohol together with carbon bisulfide and caustic alkali. However, a mixture of several of the novel xanthates may be prepared by reacting a mixture of alcohols, taken from the above described group, with carbon bisulfide and alkali, the individual xanthates being separated from the reacted mixture in any suitable way, e. g., by fractional crystallization.

The novel xanthates prepared according to the teachings of the present invention have a variety of uses being particularly adaptable for use as rubber accelerators and as flotation agents.

These xanthates are also useful particularly at higher temperatures as penetrating or "wetting out" agents in connection with mercerizing, impregnating or otherwise treating fibrous material, such as spun, woven or unwoven natural or synthetic textile fabrics or fibers, paper, leather, felt, and the like. This is particularly so with the xanthates of relatively low melting point alcohols of seventeen or eighteen carbon atoms, e. g., the unsaturated alcohols of which oleyl alcohol is an example. These latter are also effective as insecticides, aphicides, etc.

The invention is not intended to be limited to the specific description and examples given above. Any variation or modification therefrom which conforms to the spirit of the invention is intended to be included within the scope of the claims.

I claim:

1. A xanthate of a monohydric primary alcohol containing from seventeen to eighteen carbon atoms.

2. A xanthate of a normal aliphatic primary monohydric alcohol containing from seventeen to eighteen carbon atoms.

3. A xanthate of a normal saturated aliphatic primary monohydric alcohol containing from seventeen to eighteen carbon atoms.

4. A xanthate of a normal unsaturated aliphatic primary monohydric alcohol containing from seventeen to eighteen carbon atoms.

5. A chemical compound having the following structural formula:

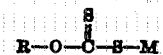

wherein R represents an aliphatic hydrocarbon radical containing from seventeen to eighteen carbon atoms, and M represents an alkali metal.

6. A xanthate of octadecyl alcohol.

7. A xanthate of 9,10-octadecenyl alcohol.

8. The compound described in claim 5, in which R is the octadecyl radical.

9. The compound described in claim 5 in which R is the 9,10-octadecenyl radical.

10. A process for preparing xanthates which comprises commingling a caustic alkali, carbon bisulfide and an aliphatic monohydric alcohol containing from seventeen to eighteen carbon atoms, effecting a reaction between the ingredients of the mixture for a period of time sufficient to form a xanthate, and separating the formed xanthate from the reacted mixture.

11. A mixture comprising essentially xanthates of octadecyl alcohol and of 9,10-octadecenyl alcohol.

12. A mixture comprising essentially the alkali metal xanthates of octadecyl alcohol and of 9,10-octadecenyl alcohol.

13. A xanthate of a normal aliphatic monohydric primary alcohol containing eighteen carbon atoms.

14. A chemical compound having the following structural formula:

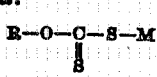

wherein R represents an aliphatic hydrocarbon radical containing eighteen carbon atoms, and M represents an alkali metal.

GEORGE D. GRAVES.